United States Patent
Zhao et al.

(10) Patent No.: US 11,659,032 B2
(45) Date of Patent: May 23, 2023

(54) METHODS, ELECTRONIC DEVICES, AND COMPUTER PROGRAM PRODUCTS FOR ACCESSING A FILE

(71) Applicant: EMC IP Holding Company LLC, Hopkinton, MA (US)

(72) Inventors: Chaojun Zhao, Chengdu (CN); Changxu Jiang, Chengdu (CN); Jianfei Yang, Chengdu (CN); Xiaoyu Ren, Du Jiangyan (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 167 days.

(21) Appl. No.: 16/881,429

(22) Filed: May 22, 2020

(65) Prior Publication Data

US 2021/0120004 A1   Apr. 22, 2021

(30) Foreign Application Priority Data

Oct. 21, 2019   (CN) .......................... 201911002078.6

(51) Int. Cl.
| | | |
|---|---|---|
| *H04L 67/1097* | (2022.01) | |
| *H04L 9/40* | (2022.01) | |
| *H04L 67/01* | (2022.01) | |
| *G06F 18/214* | (2023.01) | |

(52) U.S. Cl.
CPC ........ *H04L 67/1097* (2013.01); *G06F 18/214* (2023.01); *H04L 63/102* (2013.01); *H04L 63/108* (2013.01); *H04L 63/20* (2013.01); *H04L 67/01* (2022.05)

(58) Field of Classification Search
CPC ................. H04L 63/102; H04L 63/108; H04L 67/1097; H04L 67/42; G06K 9/6256
See application file for complete search history.

(56) References Cited

U.S. PATENT DOCUMENTS

| | | | |
|---|---|---|---|
| 9,154,296 | B1 | 10/2015 | O'Connell |
| 10,552,072 | B1 | 2/2020 | Bono et al. |
| 2010/0169392 | A1* | 7/2010 | Lev Ran ................ H04L 67/06 707/827 |
| 2016/0224798 | A1* | 8/2016 | Lim ........................ G06F 16/13 |
| 2019/0250998 | A1* | 8/2019 | Bedadala ............ G06F 11/1469 |
| 2020/0065509 | A1* | 2/2020 | Ojha .................. H04L 63/1466 |
| 2020/0302074 | A1* | 9/2020 | Little .................. G06F 21/6218 |
| 2020/0349468 | A1* | 11/2020 | Arya ....................... G06N 20/00 |
| 2020/0412726 | A1* | 12/2020 | Nev ....................... G06N 20/00 |

* cited by examiner

*Primary Examiner* — Nicholas R Taylor
*Assistant Examiner* — Sanjoy K Roy
(74) *Attorney, Agent, or Firm* — BainwoodHuang

(57) ABSTRACT

Techniques for accessing a file involve determining whether a client requests a permission for a target file, the permission allowing the client to cache data associated with the target file. The techniques further involve in response to determining that the client requests the permission, obtaining pattern information related to an access pattern in which the client accesses the target file. The techniques further involve determining availability of the permission to the client by applying the pattern information to a decision model, the decision model being trained based on training pattern information and training permission information. The techniques further involve providing, to the client, an indication on the availability. Accordingly, access conflicts can be reduced, so that the performance of the client and server can be improved.

17 Claims, 9 Drawing Sheets

METHODS, ELECTRONIC DEVICES, AND COMPUTER PROGRAM PRODUCTS FOR ACCESSING A FILE

CROSS-REFERENCE TO RELATED APPLICATION

This application claims priority to Chinese Patent Application No. CN201911002078.6, on file at the China National Intellectual Property Administration (CNIPA), having a filing date of Oct. 21, 2019, and having "METHOD, DEVICES, AND COMPUTER PROGRAM PRODUCTS FOR FILE ACCESS" as a title, the contents and teachings of which are herein incorporated by reference in their entirety.

FIELD

Embodiments of the present disclosure relate to the field of data storage, and more specifically, to a method, an electronic device and a computer program product for accessing a file.

BACKGROUND

A client caching mechanism is a common, widely-used and critical function for a remote file system, which can reduce network traffics and improve 10 performance. For example, a client can store data for writing in its local cache to reduce network packets if the client is notified there is no other client or process accessing a file. Similar caching can be done when reading a file at a server, where the client can read data from a remote file at the server and store the same at its local cache to reduce communication between the client and the server and relevant overheads, if the client knows that there is no other client or process writing data to the file.

SUMMARY

Embodiments of the present disclosure provide a solution for accessing a file.

In a first aspect of the present disclosure, a method for accessing a file is provided. The method includes determining whether a client requests a permission for a target file, the permission allowing the client to cache data associated with the target file. The method further includes, in response to determining that the client requests the permission, obtaining pattern information related to an access pattern in which the client accesses the target file. The method further includes determining availability of the permission to the client by applying the pattern information to a decision model, the decision model being trained based on training pattern information and training permission information. The method further includes providing, to the client, an indication on the availability.

In a second aspect of the present disclosure, a method of accessing a file is provided. The method includes requesting to a server permission for a target file, the permission allowing cache of data associated with the target file. The method further includes receiving from the server an indication on availability of the permission, wherein the availability is determined by applying pattern information to a decision model, the pattern information related to an access pattern of access to the target file, the decision model trained based on training pattern information and training permission information.

In a third aspect of the present disclosure, an electronic device is provided. The device includes a processor and a memory coupled to the processor, the memory having instructions stored thereon, the instructions, when executed by the processor, causing the device to perform acts. The acts include determining whether a client requests permission for a target file, the permission allowing the client to cache data associated with the target file. The acts further include in response to determining that the client requests the permission, obtaining pattern information related to an access pattern in which the client accesses the target file. The acts further include determining availability of the permission to the client by applying the pattern information to a decision model, the decision model being trained based on training pattern information and training permission information. The acts further include providing, to the client, an indication on the availability.

In a fourth aspect of the present disclosure, an electronic device is provided. The device includes a processor and a memory coupled to the processor, the memory having instructions stored thereon, the instructions, when executed by the processor, causing the device to perform acts. The acts include requesting to a server a permission for a target file, the permission allowing caching of data associated with the target file. The acts further include receiving from the server an indication on availability of the permission, wherein the availability is determined by applying pattern information to a decision model, the pattern information related to an access pattern of accessing the target file, the decision model trained based on training pattern information and training permission information.

In a fifth aspect of the present disclosure, a computer program product is provided. The computer program product is tangibly stored on a computer-readable medium and includes machine-executable instructions which, when executed, causes the machine to perform a method according to the first aspect of the present disclosure.

In a sixth aspect of the present disclosure, a computer program product is provided. The computer program product is tangibly stored on a computer-readable medium and includes machine-executable instructions which, when executed, causes the machine to perform a method according to the second aspect of the present disclosure.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the following more detailed description of the example implementations of the present disclosure with reference to the accompanying drawings, the above and other objectives, features, and advantages of the present disclosure will become more apparent, where the same reference sign usually refers to the same component in the example implementations of the present disclosure.

DETAILED DESCRIPTION OF IMPLEMENTATIONS

Figure 1:
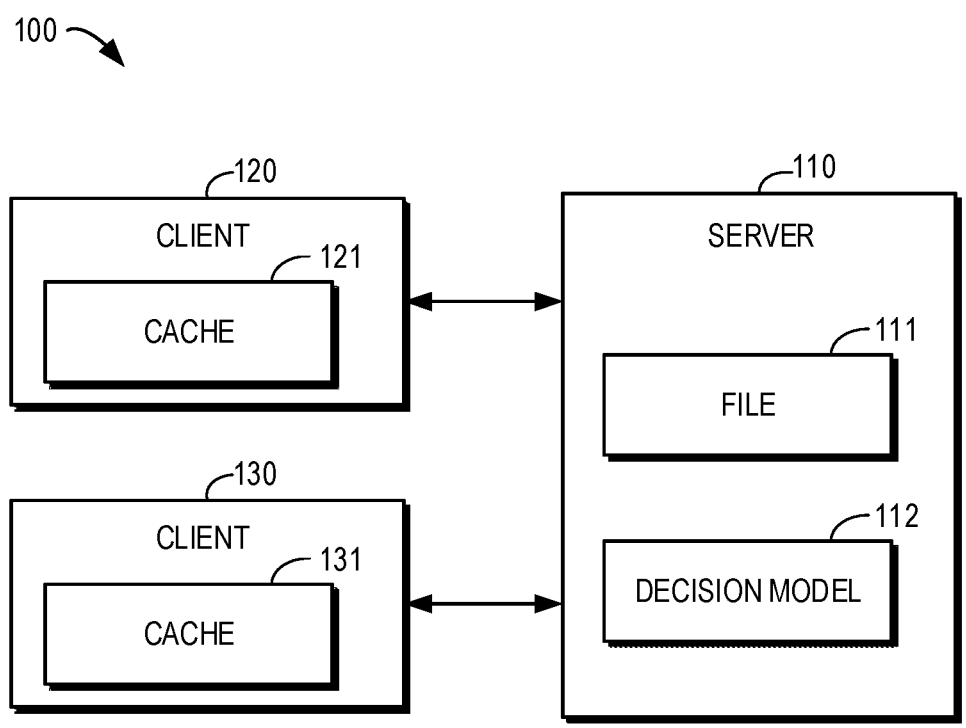
FIG. 1 shows a schematic view of an example environment in which embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will now be described with reference to several example embodiments illustrated in the drawings. Although some preferred embodiments of the present disclosure are shown in the drawings, it would be appreciated that description of those embodiments is merely for the purpose of enabling those skilled in the art to better understand and further implement the present disclosure and is not intended for limiting the scope disclosed herein in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text also can include other explicit and implicit definitions.

As mentioned above, a client caching mechanism is an important function for a remote file system. For example, in server message block SMB 2.1, a lease is introduced as a new type of client caching mechanism. Opportunity lock Oplocks is used as the client caching mechanism prior to SMB 2.1. The lease shares the same purpose as Oplocks, which allows clients to adjust their buffering policy to increase performance and to reduce network traffic. In addition, the lease provides greater flexibility and much better performance. Compared with Oplocks, another enhancement function of the lease is that it allows full caching when multiple handles are opened by the same client.

No matter Oplocks or lease, a server can send a break notification when a client file open request has a conflict with an existing Oplocks/lease. When an exclusive write-caching lease is broken, the client needs to flush its cached data to a new server or close the file, and then the server can open the file to another client. When a shared read-caching lease is broken, the server sends to the client a notification indicating the lease has been broken, but the server does not wait for any acknowledgment, as there is no cached data to be flushed to the server.

It can be seen that the lease break, especially the write-caching lease break will consume system costs. If the server can grant a lease to a file open request which is less likely to have conflicts in concurrent file sharing, performance and cache coherence balance will be improved, and the lease break costs in a system will be reduced.

There is no mechanism in conventional storage systems to predict the probability of future conflicting open requests when granting a lease. If a conflicting probability is high, the performance penalty could be severe.

Inventors of the present application realized that a conflicting probability of different open requests is closely related to access pattern in a storage environment. However, access pattern could be diverse in different user scenarios, and for a specific user scenario, the access pattern could change dynamically. In this case, a predefined or statically-configured lease granting policy will not work well in a dynamic environment.

The present disclosure provides a file accessing solution to at least overcome one or more of the above drawbacks. In this solution, a mechanism can discover access pattern and adapt to the real-time changing access pattern through self-learning. For example, the solution may use a method from the reinforcement learning area to alleviate the problems stated above. Reinforcement learning allows a system to enhance its behavior by self-learning (given a measurement of a series of actions). For example, a server (and its inner components) serves as an agent, in which case it includes two types of actions: grant permission with a proper type or not grant permission. The table maintained in the server is the environment that this agent observes. The grading system (feedback or reward) may be roughly organized depending on how long a client holds the permission before being revoked, or whether a permission is closed normally by a client, etc. Considering that a permission break cost is less for a shared permission than for an exclusive permission, feedbacks or rewards will be calculated with different weights. Based on feedback or reward the server receives from each action, the server learns to make better decisions as time progresses, and eventually exceeds the quality of permission granting compared to the conventional implementation. With such a mechanism, a permission (e.g., a lease) can be granted more effectively, the possibility of access conflicts can be reduced, thereby further improving the performance on the client and the server.

As used herein, the term "permission" refers to the implementation of a client caching mechanism, that is, a client to which a permission is granted is allowed to store data associated with a file at a server in its local cache.

Specific types of "permission" may include, e.g., read-caching, write-caching, handle-caching, etc. For the read-caching, the client may read data of an accessed file from the server in advance and store the data in its local cache. For the write-caching, the client may write data to be written to the server to its local cache and then send the data to the server in batches. For the handle-caching, the client may cache a handle of an accessed file, so that different application programs of the same client may directly manage the same file at the client when opening the file. "Permission" may be implemented in any appropriate manner, for example, may be implemented as a lease or Oplocks under the SMB protocol or may also be implemented as similar forms under other protocols.

Embodiments of the present disclosure are described in detail with reference to the drawings. FIG. 1 shows a schematic view of an example environment 100 in which embodiments of the present disclosure may be implemented. As depicted in FIG. 1, the example environment 100 may generally include a server 110 and clients 120, 130. It should be understood that the structure and functionality of the example environment 100 are described only for the purpose of illustration and do not suggest any limitation to the scope of the present disclosure. Embodiments of the present disclosure may further be applied to an environment with a different structure and/or functionality. The respective numbers of servers and clients included in the example environment 100 are also by way of example without limiting the scope of the present disclosure.

The clients 120 and 130 have caches 121 and 131, respectively. After obtaining a permission (such as a lease) from the server, the clients 120 and 130 may cache data associated with a file (e.g., a file 111) at the server.

The server 110 includes data which is accessible to the clients 120 and 130, for example, the file 111. In the following description, the file 111 may also be referred to as a target file 111. The clients 120 and 130 may request a permission for the target file 111 or a further file so as to perform relevant caching operations. The server 110 may use a decision model 112 to determine whether to grant a permission to the clients 120 and 130.

The decision model 112 may make a decision on whether a permission is granted and/or what type of permission is granted, through learning. The decision model 112 may use a real-time learning process to adaptively explore and find out a file access pattern and further come to a decision. For example, the decision model 112 may be a model based on reinforcement learning.

In the process of deploying the decision model 112, for example, during the process of the server 110 utilizing the decision model 112, the decision model 112 may be trained or updated continuously so as to make better decisions or decisions that conform to real-time status of the system. Although the decision model 112 is shown as being inside the server 110, it should be understood that the decision model 112 may also entirely or partly reside on another device with which the server 110 may communicate or on a medium which the server 110 may utilize.

Figure 2:
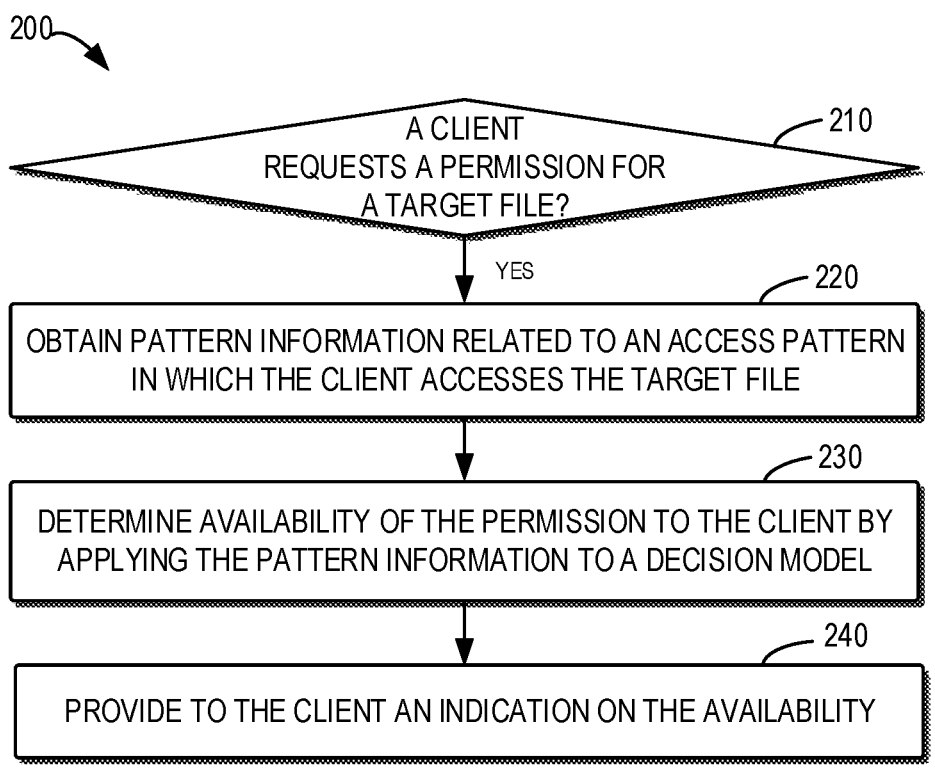
FIG. 2 shows a flowchart of a process of accessing a file according to some embodiments of the present disclosure.

Embodiments of the present disclosure will be described below in detail with reference to FIGS. 2-9. FIG. 2 shows a flowchart of a file accessing process 200 according to some embodiments of the present disclosure. For purpose of discussion, the process 200 will be described in conjunction with FIG. 1. In such an example, the process 200 may be implemented at the server 110.

At block 210, the server 110 determines whether the client 120 requests a permission for the target file 111, where the permission allows the client 120 to cache data associated with the target file 111. For example, in one implementation, the server 110 may determine whether the client 120 requests a lease for the target file 111. The server 110 may use any appropriate approach to determine whether the client 120 requests a lease for the target file 111.

In some embodiments, for example, the request for a permission may be sent from the client 120 to the server 110 as an independent request. In some embodiments, the request for a permission may be included in an open request for the target file 111 from the client 120. After passing a shared violation check, the server 110 may determine whether the open request for the target file 111 from the client 120 includes the request for a permission.

If the server 110 determines the client 120 requests the permission, then the process 200 proceeds to block 220. At block 220, the server 110 obtains pattern information related to an access pattern that the client 120 accesses the target file 111. The pattern information may include various information related to the client 120 accessing the target file 111.

The pattern information may include an operation to be performed on the target file 111 by the client 120. Such an operation may include, but is not limited to, read, write and close. The pattern information may further include an identification of the client 120, e.g., an ID of the client 120. The pattern information may further include time on which the client 120 makes a request for a permission, for example, year, month, day when the request is sent, specific time in a day (for example, hours, minutes). In some embodiments, such information may be obtained from the open request for the target file 111 from the client 120.

The pattern information may further include the level or type of permission for the target file 111 which the client 120 can obtain. In some embodiments, the server 110 may determine whether the target file 111 is being accessed or to be accessed by a further client. If the target file 111 is being accessed or to be accessed by the further client (e.g., the client 130), then the server 110 may determine that the permission requested by the client 120 has a first permission level. If there is no further client that is accessing or to access the target file 111, then the server 110 may determine the permission requested by the client 120 has a second permission level that is higher than the first permission level.

In some embodiments, the first permission level may correspond to a shared permission, while the second permission level may correspond to an exclusive permission. The exclusive permission may refer to a permission including a write caching, while the shared permission does not include a write caching.

For example, where a permission is implemented as a lease, the exclusive lease may start one or more of read caching, write caching and handle caching, for example, read and write caching RW as well as read, write and handle caching RWH. The shared lease may start one or more of read caching and handle caching, for example, read caching R as well as read and handle caching RH. In this case, if the server 110 determines there is no further client accessing the target file 111, then the server 110 may determine the lease which can be granted to the client 120 has a higher level, for example, an exclusive lease. If the server 110 determines the request from the client 120 will cause a file access conflict or conflicts with an existing file access, then the server 110 may determine the lease which can be granted to the client 120 has a lower level, such as a shared lease.

At block 230, the server 110 determines the availability of the lease to the client 120 by applying the pattern information to the decision model 112. The decision model 112 is trained based on training pattern information and training permission information. As used herein, the availability may include whether to grant the permission (e.g., a lease) for the target file 111 to the client 120. Where the client 120 is granted the permission, the availability may further include or indicate which type of permission is granted to the client 120. The type of the permission may be specific to the type of cache being used, for example, RWH, RW, RH and the like as mentioned above. As one example, where the permission is implemented as a lease, the availability may indicate granting to a client 120 an exclusive lease, a shared lease or no lease is granted to the client 120.

As mentioned above with reference to FIG. 1, the decision model 112 may adaptively explore and find out file access patter through a learning process (such as reinforcement learning) to come to a decision. The training pattern information and training permission information for training the decision model 112 may include at least one of: pattern information related to a permission for a file of a further server (or a further storage system) and corresponding permission information (including whether a permission and a feedback are granted, as to be described below), pattern information related to a permission for a file (including the target file 111 and a further file) of the server 110 and corresponding permission information.

For example, the decision model 112 may be trained with the grant of a lease in another server and then be deployed in the server 110. The decision model 112, after being built, may be directly deployed in the server 110 and then be trained with the grant of a lease in the server 110. After being deployed, the decision model 112 may further be trained or updated based on the grant of a lease in the server 110, as to be further described below.

Figure 3:
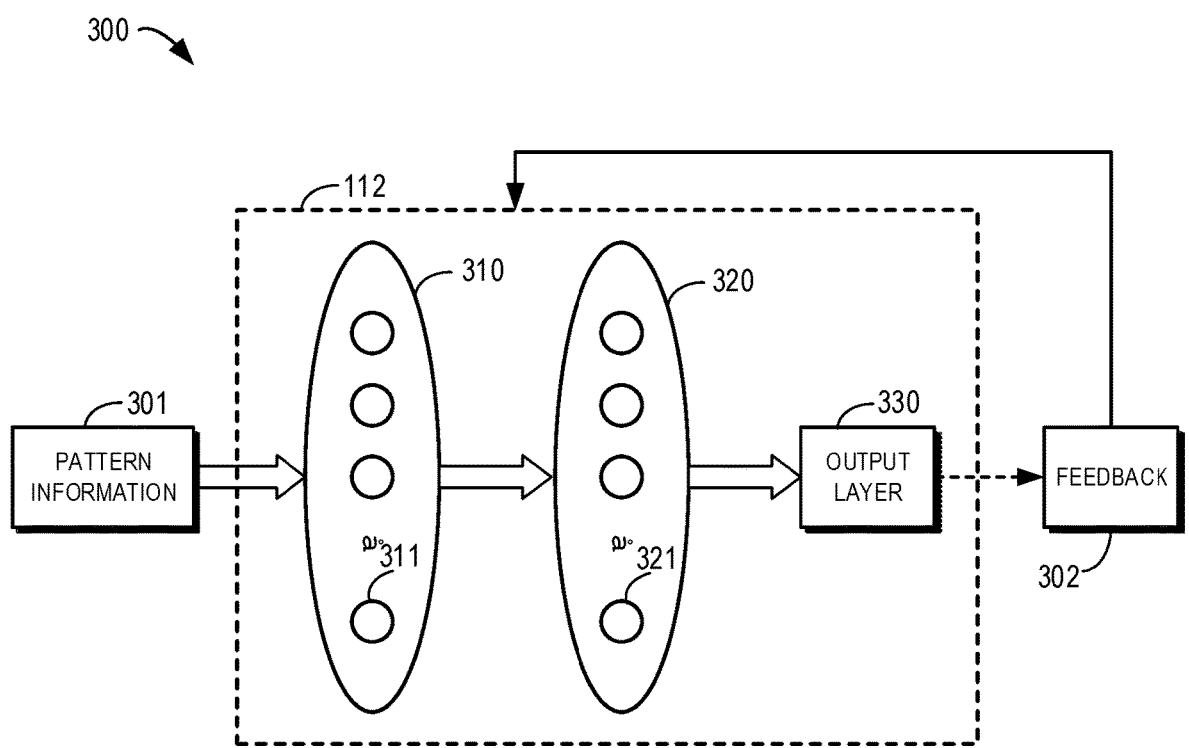
FIG. 3 shows a schematic view of one example of a decision model according to some embodiments of the present disclosure.

With reference to FIG. 3, this figure shows a schematic view 300 of one example of the decision model 112 according to some embodiments of the present disclosure. It should be understood the structure of the decision model 112 shown in FIG. 3 is merely illustrative without limiting the protection scope of the present disclosure. According to embodiments of the present disclosure, the decision model 112 may be built with any appropriate structure or network.

In the example of FIG. 3, the decision model 112 includes a first layer 310, a second layer 320 and an output layer 330, where the first layer 310 and the second layer 320 includes a plurality of neurons 311 and 321, respectively. The decision model 112 uses pattern information 301 as input, which is obtained at block 220 and may be used to evaluate a current environment, and outputs a decision on availability via the output layer 330. In some embodiments, the decision model 112 may directly make a decision on which type of permission is to be granted to the client 120, or make a decision that a permission is not granted to the client 120. In some embodiments, the decision model 112 may output probabilities for different decisions. For example, the decision model 112 may output a probability of granting an exclusive permission, a probability of granting a shared permission and a probability of not granting permission. Then, the server 110 may determine the availability (e.g., an option of the highest probability) of the permission requested by the client 120 based on these probabilities, that is, which type of permission is to be granted to the client 120 or permission is not granted to the client 120.

As one example, where permission is implemented as a lease, the decision model 112 may output the probability of granting exclusive lease, the probability of granting shared lease and the probability of not grating lease. Then, the server 110 may select an appropriate type of lease to grant to the client 120. In order to grant an appropriate type of lease, when the permission level or type determined at block 220 corresponds to an exclusive lease, the exclusive lease or a shared lease may be granted to the client 120, or no lease is granted to the client 120, in accordance with probabilities.

Similarly, when the permission level or type determined at block 220 corresponds to the shared lease, the shared lease may be granted to the client 120, or no lease is granted to the client 120, in accordance with probabilities. It should be understood in this implementation, since the output type of the decision model 112 may not be changed or not easy to change, where the permission level or type corresponds to the shared lease, if an option with the highest probability is the exclusive lease, then the shared lease may be considered.

Subsequently, the server 110 may determine a feedback 302 on the decision made by the decision model 112. The feedback 302 (e.g., a reward) may be used to further train or update the decision model 112. For example, parameters (e.g., W1, b1) of the first layer 310 and/or parameters (W2, b2) of the second layer 320 of the network may be updated based on the feedback 302. Further description will be presented below with reference to FIGS. 3 and 4.

Still with reference to FIG. 2, at block 240, the server 110 provides, to the client 120, an indication on the availability. For example, the server 110 may indicate, to the client 120 and in a packet sent to the client 120, the type of the granted permission for the target file 111, or indicate, to the client 120 and in a packet sent to the client 120, that permission is not granted for the target file 111. After receiving the indication from the server 110, the client 120 may access the target file 111 in accordance with the indication.

The solution for accessing a file according to some embodiments of present disclosure has been described with reference to FIGS. 1 to 3. In such embodiments, with the decision model that may learn continuously, the server may evolve continuously and make better decisions on permission requests, find out rules behind file access patterns and correctly reject permission requests that may cause conflicts. In this way, the performance of the client and the server may further be improved. In addition, this implementation will not affect other services on a system since it is only an enhancement function of determining whether a right type of permission (e.g., a lease) should be granted for a file open request. The solution is user-friendly since it does not need any interaction with customers. Furthermore, the decision model used is a light weight decision-making algorithm and easy to implement.

Figure 4:
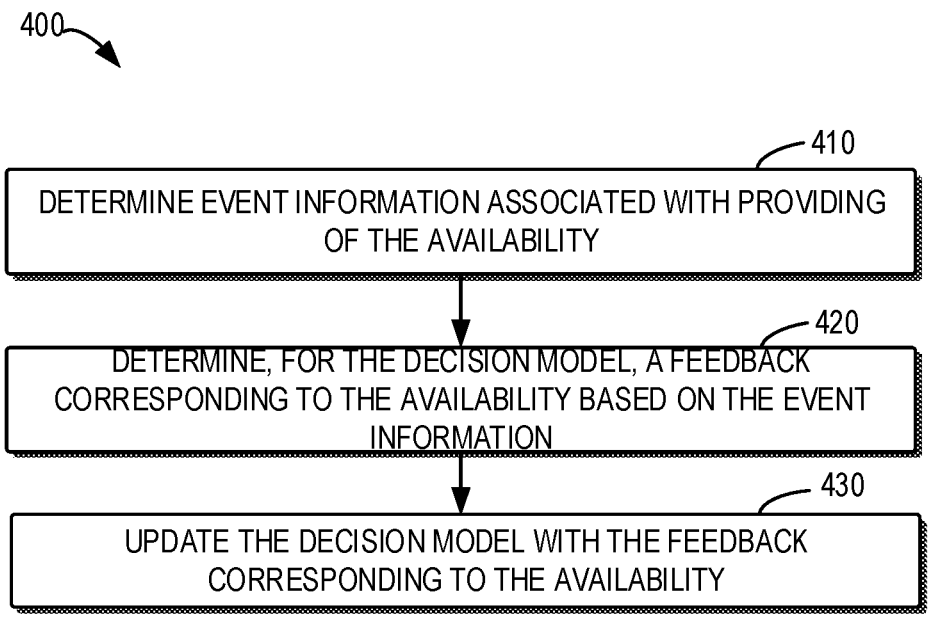
FIG. 4 shows a flowchart of a process of updating a decision model according to some embodiments of the present disclosure.

As mentioned above, the decision model 112 may be reinforced through continuous learning during deployment. This embodiment will be described with reference to FIG. 4. FIG. 4 shows a flowchart of a process 400 of updating a decision model according to some embodiments of the present disclosure. For the purpose of discussion, the process 400 is described in conjunction with FIGS. 1 and 3.

At block 410, a server 110 determines event information associated with providing availability. The event information may indicate at least one of: maintenance of a granted permission, disabling of a granted permission and access to a target file 111. In other words, the quality of a decision on granting or refusing the permission may be considered or evaluated.

If the permission is granted to the client 120, then the event information may indicate how long the permission is maintained, whether and/or when the permission is broken, revoked or disabled, or indicate that the permission ends normally without being broken, etc. If the client 120 is not granted a permission, then the event information may indicate whether there is an access conflicting method within a period of time (e.g., within a predetermined period of time or during the client 120 accessing the target file 111), that is, whether there is a further client accessing the target file 111.

At block 420, the server 110 determines, based on the event information, a feedback 302 corresponding to the availability (e.g., the availability determined at block 230) and used for the decision model 112. Depending on the event information, the feedback 302 may be a positive feedback (e.g., a reward with a positive value) or a negative feedback (e.g., a punishment with a negative value).

Where the client 120 is granted a permission for the target file 111, the event information may indicate whether the permission (e.g., a lease) is broken, when the permission is broken, etc. If the event information indicates the permission is maintained for a period of time, then the server 110 may determine the feedback 302 is positive. If the event information indicates disabling of the permission, e.g., broken during the client 120 accessing the target file 111, then the server 110 may determine the feedback 302 is negative. Amounts of positive feedback or negative feedback, e.g., the positive or negative value of a reward may depend on the duration and/or type of the permission.

Where the client 120 is refused grant of a permission for the target file 111, the event information may indicate whether an access conflict has happened, that is, whether there is a further client accessing the target file 111 during a period of time. If the event information indicates the target file 111 has not been accessed by a further client for a period of time, then the server 110 may determine the feedback 302 is negative. Amounts of the negative feedback may be adjustable, and embodiments of the present disclosure are not limited in this regard.

At block 430, the server 110 updates the decision model 112 with the feedback 302 corresponding to the availability. For example, parameters of the network of the decision model 112 may be updated. In other words, the decision model 112 may be trained further.

In this embodiment, the decision model 112 may be adjusted according to the state of the system (e.g., a file access pattern). In this way, the decision model 112 may be dynamically adapted to the current state of the system including the server and the client, thereby making a more appropriate decision. The decision made as such can reduce the probability of occurrence of conflict and decrease costs caused by the break of permission, such as a lease.

How to determine a feedback for the decision model 112 will be illustrated below by way of a specific example. In this example, the feedback may also be referred to as a reward. Where the server 110 grants an exclusive permission to the client 120, the following rules may be applied:

if an exclusive permission endures for at least 1 hour without being broken, then a reward may be 10;

if an exclusive permission break happens before an average permission duration, then a reward may be −5 to −10;

if an exclusive permission break happens after the average permission duration, then a reward may be −1;

if an exclusive permission break happens after 2 times of the average permission duration, then a reward may be 2 to 9;

if an exclusive permission is normally closed without a break, then a reward may be 1 to 10.

Where the server 110 grants a shared permission to the client 120, a certain amount of discount (e.g., 50% to 80%) will be applied to the value of the reward. The size of the discount may vary depending on the system. Where the cost of breaking a shared permission break is low, the discount may even be 0, that is, the feedback corresponding to the shared permission is not considered.

Where the server 110 does not grant a permission to the client 120, if no file access conflict happens, then a reward may be −10.

It should be understood that the specific values of rewards above are merely by way of example and not limiting. In addition, the division of the above reward levels is also by way of example. In embodiments of the present disclosure, more or less reward levels may exist, for example, only two levels of whether a permission is broken or not, regardless of the duration of the permission.

Figure 5:
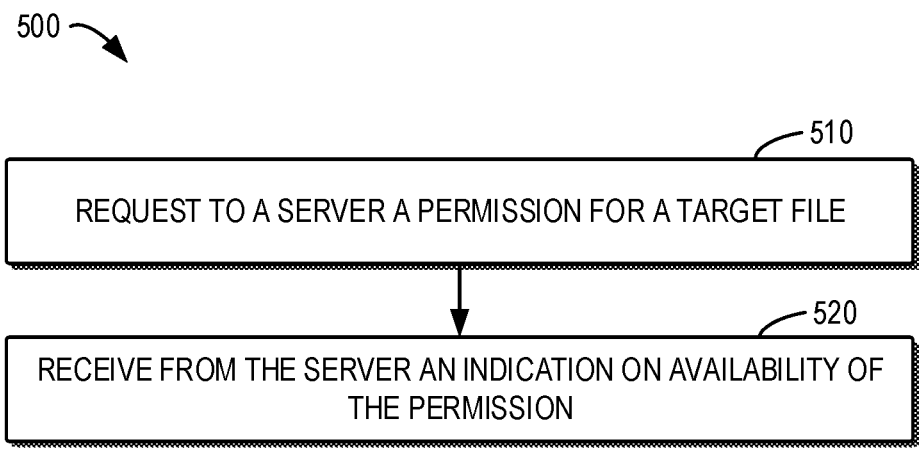
FIG. 5 shows a flowchart of a process of accessing a file according to some embodiments of the present disclosure.

FIG. 5 shows a flowchart of a process 500 of accessing a file according to some embodiments of the present disclosure. For the purpose of discussion, the process 500 will be described in conjunction with FIG. 1. In this example, the process 500 may be implemented at a client 120 and/or a client 130. Simply for purpose of discussion, the process 500 will be described in conjunction with the client 120.

At block 510, the client 120 requests a server 110 for permission for a target file 111. The permission allows the client 120 to cache data associated with the target file 111. For example, the client 120 may include a request for a lease for the target file 111 in an open request for the target file 111.

At block 520, the client 120 receives from the server 110 an indication on the availability of the permission. For example, the indication may indicate to the client 120 whether the requested permission is granted or which type of permission is granted. The availability is determined by applying pattern information to the decision model 112, the pattern information is related to an access pattern in which the target file 111 is accessed, and the decision model 112 is trained based on training pattern information and training permission information. The availability is determined as described with respect to the process 200.

The above described solution for accessing a file according to embodiments of the present disclosure utilizes a decision model with learning ability. A specific example will be given below to illustrate the verification and effect of this solution. In this example, an example of a permission being implemented as a lease will be used for illustration.

Figure 6:
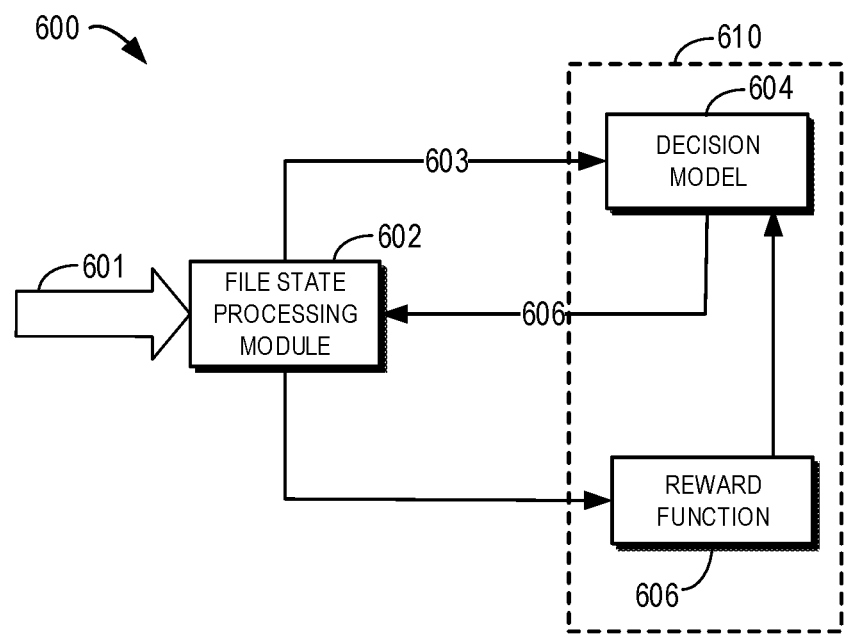
FIG. 6 shows a logical view of an emulation model according to some embodiments of the present disclosure.

FIG. 6 shows a logical view 600 of an emulation model according to some embodiments of the present disclosure. A file state processing module 602 processes a simulated request from a client, including a file open request or write request. The file state processing module 602 further generates input information 603 which is used for simulating the above mentioned pattern information as input of a decision model 604. The decision model 604 sends a decision made about the permission availability (whether a permission is granted or not, the type of a permission) to the file state processing module 602. Subsequently, the file state processing module 602 generates a reward for the decision on the decision model 604 and appends the reward to a reward function 606. The reward function 606 is sent to the decision model 604 for training the decision model 604. Elements included in block 610 may be elements to be actually deployed, for example, the decision model 604 may be one implementation of the decision model 112.

The rewards may be calculated based on lease break logic. The server will send a lease break notification to the client when a lease conflict is detected. In the simulation, lease break conditions may be summarized as condition A and condition B as below. Condition A: an exclusive lease exists on another client while an open request is received from one client. Condition B: one or more shared leases exist on other clients while a write request is received from a client.

Figure 7A:
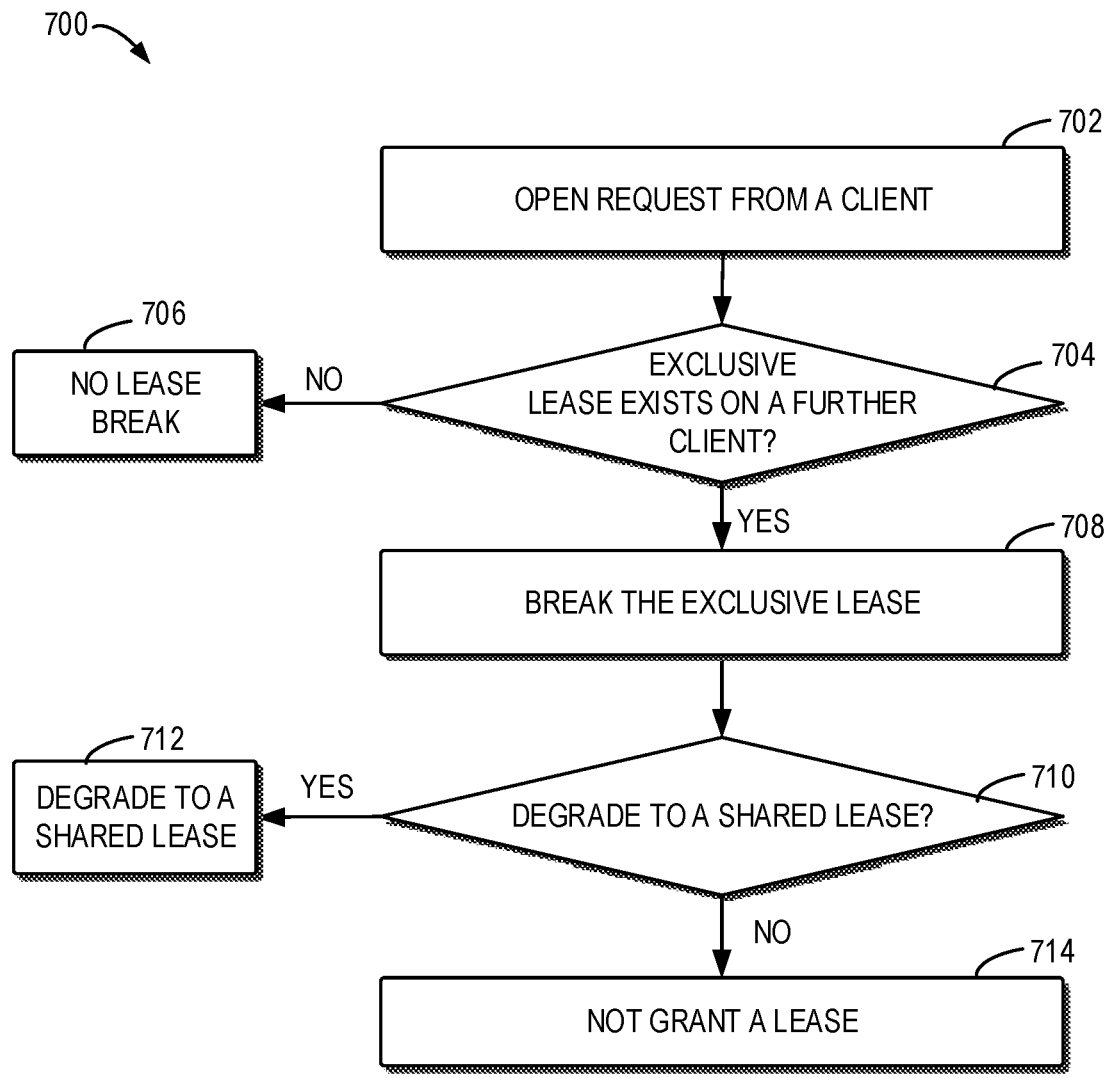
FIG. 7A shows an example logical process of condition A for a lease break according to some embodiments of the present disclosure.

FIG. 7A shows an example logical process 700 for condition A of a lease break. At block 702, an open request for a file is received from a client. At block 704, it is determined whether there exists an exclusive lease for the file on a further client or not. If it is determined that there is no exclusive lease for the file on the further client, then the process 700 proceeds to block 706, i.e., no lease break. If it is determined that there is an exclusive lease for the file on the further client, then the process 700 proceeds to block 708, where the exclusive lease for the file is broken. At block 710, it is determined whether the lease is degraded to a shared lease. If it is determined that the lease is degraded to a shared lease, then the process 700 proceeds to block 712, where the further client is degraded to a shared lease. If it is determined that the lease is not degraded to a shared lease, then the process 700 proceeds to block 714, where a lease is not granted.

Figure 7B:
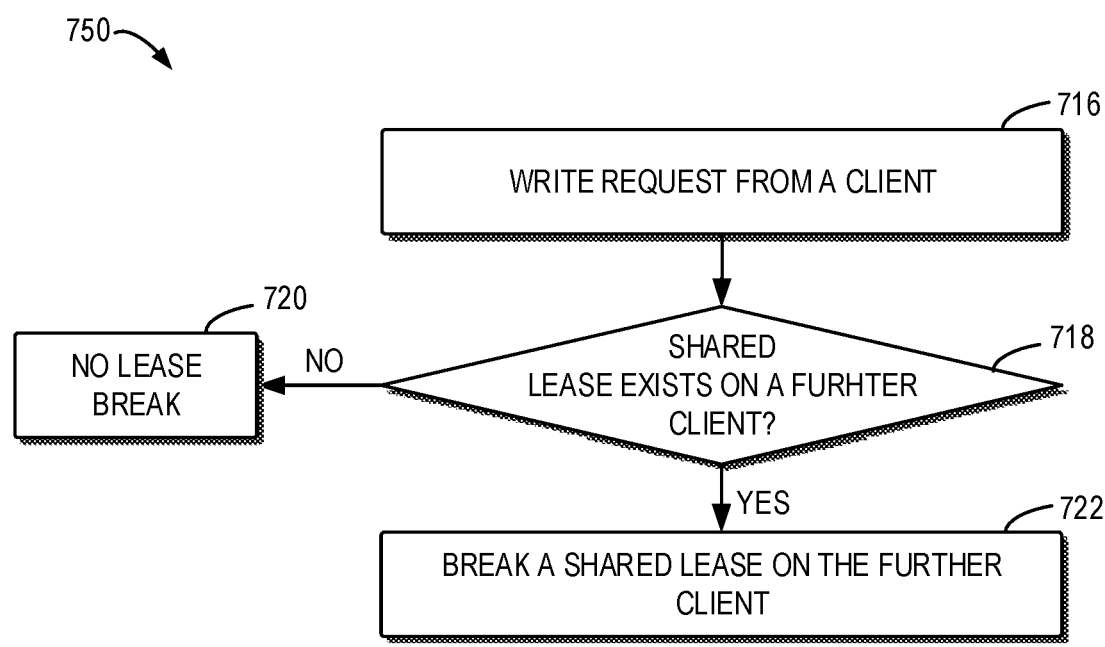
FIG. 7B shows an example logical process of condition B for a lease break according to some embodiments of the present disclosure.

FIG. 7B shows an example logical process 750 for condition B of a lease break. At block 716, a write request for a file is received from a client. At block 718, it is determined whether there exists a shared lease for the file on a further client. If it is determined that there is no shared lease for the file on the further client, then the process 750 proceeds to block 720, where there is no lease break. If it is determined that there is a shared lease for the file on the further client, then the process 750 proceeds to block 722, where the shared lease on the other client is broken.

Now explanations are presented to parameters used in the simulation.

X: the number of clients that may access the file with open requests. It is assumed that all clients have a lease capability.

client_id: an identification of a client making an open request. The range of "client_id" is 0, . . . , X−1.

Tn: the time point of an open request of the client for the file. Tn is recorded with a format "year-month-day hours: minutes: seconds." For example, if Tn is '2019-06-07 06:36: 11', then Tn.year is 2019, Tn.month is 6, Tn.day is 7, Tn.hours is 6, Tn.minutes is 36, and Tn.seconds is 11.

action: an operation for the file. The operation is "read," "write" or "close."

Data_frame: the access pattern of a file by X clients is designed to test the algorithm and may be demonstrated as Table 1.

TABLE 1

Examples of Access Pattern for Simulation

| Time Point | Access Information [client_id, action] |
|---|---|
| T1 | [0, read] |
| T2 | [1, read] |
| T3 | [0, close] |
| T4 | [2, write] |
| . . . | . . . |
| TN | [X-1, close] |
| . . . | . . . |

T_dur: the duration for which each client owned a lease last time. T_dur=[t_dur[0], t_dur[0], t_dur[1], . . . , t_dur[X−1]]

duration_train: a period of time. Training will happen during every period of time duration_train.

R: a reward calculated for the decision made by the decision model for each request. R=[r[0], r[1], . . . , r[X]], r[client_id]=reward_calculator(t_dur[client_id],break_flag, noDeleNoConflict), where break_flag is a 3-bit flag to record whether the lease is an exclusive lease or a shared lease and whether the lease is broken, and noDeleNoConflict is used to record whether a conflict happens where no lease is granted for an open request.

rewards: the rewards calculated for each decision on each request made by the decision model over a period of time duration_train. For each decision, rewards will be appended with a reward.

data_in: the input constructed for the decision model, i.e., for simulating the above mentioned pattern information. For the Data_frame at Tn, data_in =[action, client_id, action, lease_type, Tn.year, Tn.month, Tn.day, Tn.hours, Tn.minutes, t_dur[client_id]]. lease_type is an exclusive lease (because an exclusive lease can be granted only when no other client is accessing the file), or else the lease_type is a shared lease.

The following steps may be performed as below for each real-time open request that has passed a share violation check.

Step 1: If a client requests a lease, then the file state processing module 602 will set the possible lease_type as an exclusive leasing for the first open request for the file, or else the lease_type is a shared lease, and then the flow goes to step 2. Otherwise, no lease will be granted.

Step 2: The file state processing module 602 sends the data_in to the decision model 604.

Step 3: The decision model 604 receives the data_in, then calculates a possibility value, for example, based on reinforcement learning RL, as described above.

Step 4: The file state processing module 602 receives a response from the decision model 604 and determines whether to grant a proper lease to the request.

Step 5: The file state processing module 602 calculates rewards and appends the rewards to the reward function 606.

Step 6: The rewards during each duration_train are sent back to the decision model 604 as an input for training the decision model 604.

Figure 8:
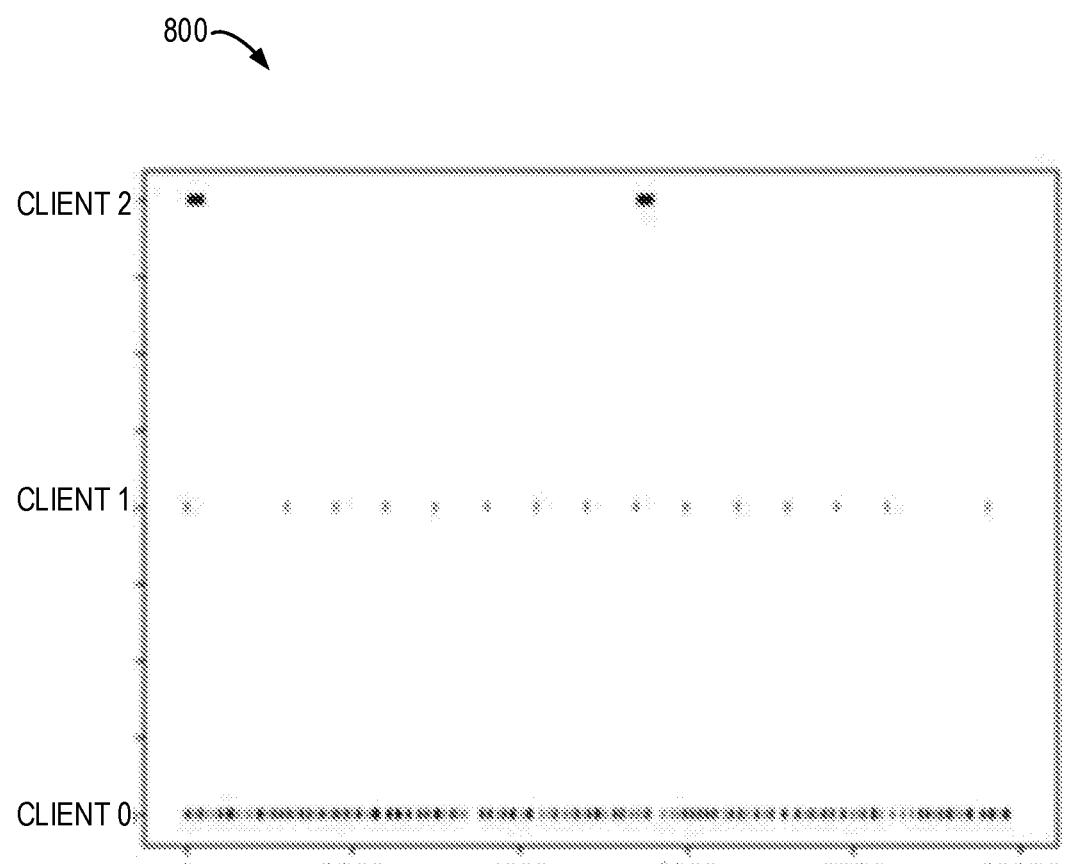
FIG. 8 shows a schematic view of an access pattern corresponding to a simulated scenario.

As one example, a simulation result is provided for the scenario where X=3 clients access one file. Client 0 will write this file in a row at random intervals. The open duration conforms to normal distribution (e.g., an application that stores information permanently to a file is simulated). Client 1 will open this file periodically (e.g., every hour), and the open duration might be very short. (e.g., a virus scan is simulated). Client 2 will read this file periodically with a long duration, e.g., once a day. The open duration might be long. (e.g., a backup application is simulated, which might read the whole file). FIG. 8 shows a schematic view 800 of an access pattern corresponding to the simulated scenario.

Table 2 shows a simulation result with respect to the above scenario. In this scenario, the decision model can reduce a break count for about 193.98% compared with a scenario where there is no decision model in 35 days. Only exclusive-leasing breaks are counted herein since a shared-lease break is trifling compared to an exclusive-lease break. As can be seen from this simulation, the solution of the present disclosure shows advantageous effects on reducing lease breaks.

TABLE 2

One Example of Simulation Result

| Lease break count (no decision model) | Lease break count (with decision model) | Comparison between no decision model and with decision model |
|---|---|---|
| 4936 | 1679 | 193.98% |

Figure 9:
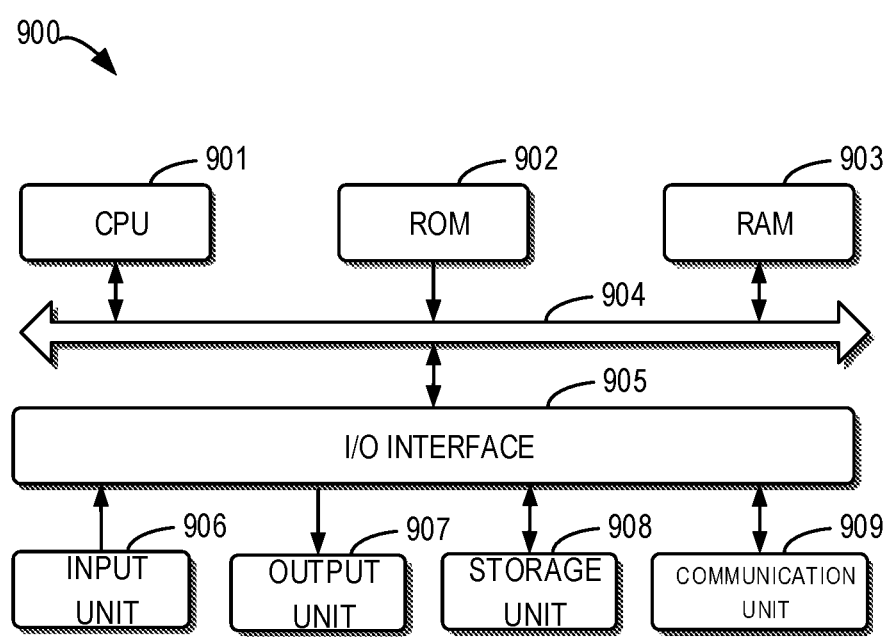
FIG. 9 shows a block diagram of an example device which can be used to implement embodiments of the present disclosure.

FIG. 9 is a schematic block diagram illustrating an example device 900 that can be used to implement embodiments of the present disclosure. As illustrated, the device 900 includes a central processing unit (CPU) 901 which can perform various suitable acts and processing based on the computer program instructions stored in a read-only memory (ROM) 902 or computer program instructions loaded into a random access memory (RAM) 903 from a storage unit 908. The RAM 903 also stores various types of programs and data required by operating the storage device 900. The CPU 901, ROM 902 and RAM 903 are connected to each other via a bus 904 to which an input/output (I/O) interface 905 is also connected.

Various components in the device 900 are connected to the I/O interface 905, including: an input unit 906, such as a keyboard, a mouse and the like; an output unit 907, such as a variety of types of displays, loudspeakers and the like; a storage unit 908, such as a magnetic disk, an optical disk and the like; and a communication unit 909, such as a network a card, a modem, a wireless communication transceiver and the like. The communication unit 909 enables the device 900 to exchange information/data with other devices via a computer network such as Internet and/or a variety of telecommunication networks.

The processing unit 901 performs various methods and processes as described above, for example, any of the processes 200, 400 and 500. For example, in some embodiments, any of the processes 200, 400 and 500 may be implemented as a computer software program or computer program product, which is tangibly included in a machine-readable medium, such as the storage unit 908. In some implementations, the computer program may be partially or fully loaded and/or installed to the device 900 via the ROM 902 and/or the communication unit 909. When the computer program is loaded to the RAM 903 and executed by the CPU 901, one or more steps of any of the processes 200, 400 and 500 described above are implemented. Alternatively, in other implementations, the CPU 901 may be configured to implement any of the processes 200, 400 and 500 in any other suitable manner (for example, by means of a firmware).

According to some embodiments of the present disclosure, there is provided a computer-readable medium. The computer-readable medium is stored with a computer program which, when executed by a processor, performs the method according to the present disclosure.

Those skilled in the art would understand that various steps of the method of the disclosure above may be implemented via a general-purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that although several means or sub-means (e.g., specialized circuitry) of the apparatus have been mentioned in detailed description above, such partition is only by way of example, but not mandatory. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not intended to limit the present disclosure. For those skilled in the art, the present disclosure may have various modifications and changes. Any modifications, equivalents and improvements made within the spirit and principle of the present disclosure should be included within the scope of the present disclosure.

We claim:
1. A method of accessing a file, comprising:
determining whether a client requests a permission for a target file, responsive to receipt of an open request for the target file from the client, the permission allowing the client to cache data associated with the target file;
in response to determining that the client requests the permission, obtaining pattern information from the open request received from the client, wherein the pattern information is related to an access pattern in which the client accesses the target file and includes a time when the client requests the permission, wherein the time the client requests the permission comprises a year, month, and day when the open request was sent from the client, and wherein determining that the client requests the permission for the target file comprises determining that the open request received from the client includes a request from the client for the permission;
determining availability of the permission to the client by applying the pattern information to a decision model, the decision model being trained based on training pattern information and training permission information;
providing, to the client, an indication on the availability;
determining event information associated with providing of the availability, the event information indicating at least one of maintenance of the permission, disabling of the permission and access to the target file;
determining, for the decision model, a feedback corresponding to the availability, based on the event information, at least in part by:
determining as the feedback a reward in response to a period of time during which the permission is maintained,
wherein the reward has a first value in the event that a break in the permission happens before the period of time during which the permission is maintained reaches an average permission duration,
wherein the reward has a second value in the event that a break in the permission happens after the period of time during which the permission is maintained reaches the average permission duration,
wherein the first value is less than the second value,
wherein the reward has a third value in the event that a break in the permission happens after a period of time during which the permission is maintained reaches a multiple of the average permission duration, and
wherein the third value is greater than the second value; and
updating the decision model with the feedback corresponding to the availability.

2. The method of claim 1, wherein obtaining the pattern information comprises:
determining whether the target file is being accessed or is to be accessed by a further client;
in response to determining that the target file is being accessed or is to be accessed by the further client, determining that the permission has a first permission level; and
in response to determining that no further client is accessing or is to access the target file, determining that the permission has a second permission level higher than the first permission level.

3. The method of claim 2, wherein the first permission level corresponds to a shared permission, and the second permission level corresponds to an exclusive permission.

4. The method of claim 2, wherein obtaining the pattern information further comprises obtaining:
an operation to be performed on the target file by the client, and
an identification of the client.

5. The method of claim 1, wherein the availability indicates that the client is refused to be granted the permission, and wherein determining the feedback corresponding to the availability comprises:
in response to the event information indicating that the target file is not accessed by a further client during a period of time, determining that the feedback corresponding to the availability is a negative feedback.

6. The method of claim 1, wherein the availability indicates that the client is allowed to be granted the permission, and wherein determining the feedback corresponding to the availability comprises:
in response to the event information indicating that the permission is maintained during a period of time, determining that the feedback corresponding to the availability is a positive feedback; and
in response to the event information indicating that the permission is disabled during the client accessing the target file, determining that the feedback corresponding to the availability is a negative feedback.

7. The method of claim 6, wherein amounts of the positive feedback and the negative feedback depend on at least one of a type of the permission and duration of the permission.

8. The method of claim 1, wherein the decision model is a model based on reinforcement learning.

9. An electronic device, comprising:
a processor; and
a memory coupled to the processor and having instructions stored thereon, the instructions, when executed by the processor, causing the device to perform acts comprising:
determining whether a client requests a permission for a target file, responsive to receipt of an open request for the target file from the client, the permission allowing the client to cache data associated with the target file;
in response to determining that the client requests the permission, obtaining pattern information from the open request received from the client, wherein the pattern information is related to an access pattern in which the client accesses the target file and includes a time when the client requests the permission, wherein the time the client requests the permission comprises a year, month, and day when the open request was sent from the client, and wherein determining that the client requests the permission for the target file comprises determining that the open request received from the client includes a request from the client for the permission;
determining availability of the permission to the client by applying the pattern information to a decision model, the decision model being trained based on training pattern information and training permission information;
providing, to the client, an indication on the availability;
determining event information associated with providing of the availability, the event information indicating at least one of maintenance of the permission, disabling of the permission and access to the target file;
determining, for the decision model, a feedback corresponding to the availability, based on the event information, at least in part by:
determining as the feedback a reward in response to a period of time during which the permission is maintained,
wherein the reward has a first value in the event that a break in the permission happens before the period of time during which the permission is maintained reaches an average permission duration,
wherein the reward has a second value in the event that a break in the permission happens after the period of time during which the permission is maintained reaches the average permission duration,
wherein the first value is less than the second value,
wherein the reward has a third value in the event that a break in the permission happens after a period of time during which the permission is maintained reaches a multiple of the average permission duration, and
wherein the third value is greater than the second value; and
updating the decision model with the feedback corresponding to the availability.

10. The device of claim 9, wherein obtaining the pattern information comprises:
determining whether the target file is being accessed or to be accessed by a further client;
in response to determining that the target file is being accessed or to be accessed by the further client, determining that the permission has a first permission level; and
in response to determining that no further client is accessing or to access the target file, determining that the permission has a second permission level higher than the first permission level.

11. The device of claim 10, wherein the first permission level corresponds to a shared permission, and the second permission level corresponds to an exclusive permission.

12. The device of claim 10, wherein obtaining the pattern information further comprises obtaining:
an operation to be performed on the target file by the client, and
an identification of the client.

13. The device of claim 9, wherein the availability indicates that the client is refused to be granted the permission, and wherein determining the feedback corresponding to the availability comprises:

in response to the event information indicating that the target file is not accessed by a further client during a period of time, determining that the feedback corresponding to the availability is a negative feedback.

14. The device of claim 9, wherein the availability indicates that the client is allowed to be granted the permission, and wherein determining the feedback corresponding to the availability comprises:
in response to the event information indicating that the permission is maintained during a period of time, determining that the feedback corresponding to the availability is a positive feedback; and
in response to the event information indicating that the permission is disabled during the client accessing the target file, determining that the feedback corresponding to the availability is a negative feedback.

15. The device of claim 14, wherein amounts of the positive feedback and the negative feedback depend on at least one of a type of the permission and duration of the permission.

16. The device of claim 9, wherein the decision model is a model based on reinforcement learning.

17. A computer program product having a non-transitory computer readable medium which stores a set of instructions to access a file; the set of instructions, when carried out by computerized circuitry, causing the computerized circuitry to perform a method of:
determining whether a client requests a permission for a target file, responsive to receipt of an open request for the target file from the client, the permission allowing the client to cache data associated with the target file;
in response to determining that the client requests the permission, obtaining pattern information from the open request received from the client, wherein the pattern information is related to an access pattern in which the client accesses the target file and includes a time when the client requests the permission, wherein the time the client requests the permission comprises a year, month, and day when the open request was sent from the client, and wherein determining that the client requests the permission for the target file comprises determining that the open request received from the client includes a request from the client for the permission;
determining availability of the permission to the client by applying the pattern information to a decision model, the decision model being trained based on training pattern information and training permission information;
providing, to the client, an indication on the availability;
determining event information associated with providing of the availability, the event information indicating at least one of maintenance of the permission, disabling of the permission and access to the target file;
determining, for the decision model, a feedback corresponding to the availability, based on the event information, at least in part by:
determining as the feedback a reward in response to a period of time during which the permission is maintained,
wherein the reward has a first value in the event that a break in the permission happens before the period of time during which the permission is maintained reaches an average permission duration,
wherein the reward has a second value in the event that a break in the permission happens after the period of time during which the permission is maintained reaches the average permission duration,
wherein the first value is less than the second value,
wherein the reward has a third value in the event that a break in the permission happens after a period of time during which the permission is maintained reaches a multiple of the average permission duration, and
wherein the third value is greater than the second value; and
updating the decision model with the feedback corresponding to the availability.

* * * * *